Aug. 28, 1951 — M. P. SPARTALIS — 2,565,786
COOKING MACHINE
Filed Sept. 29, 1950 — 3 Sheets-Sheet 1
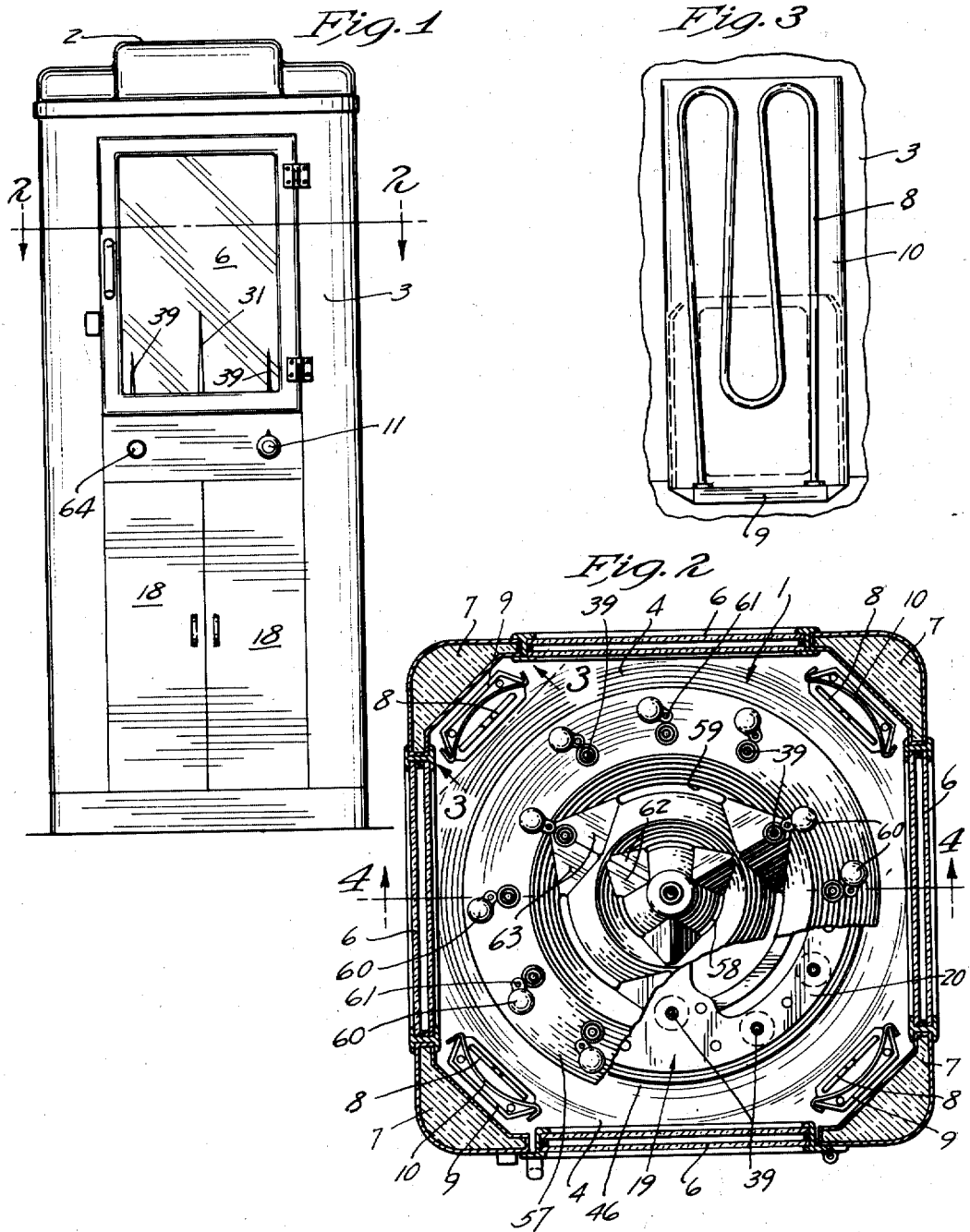
Inventor
Michael P. Spartalis
By his Attorneys
Merchant & Merchant

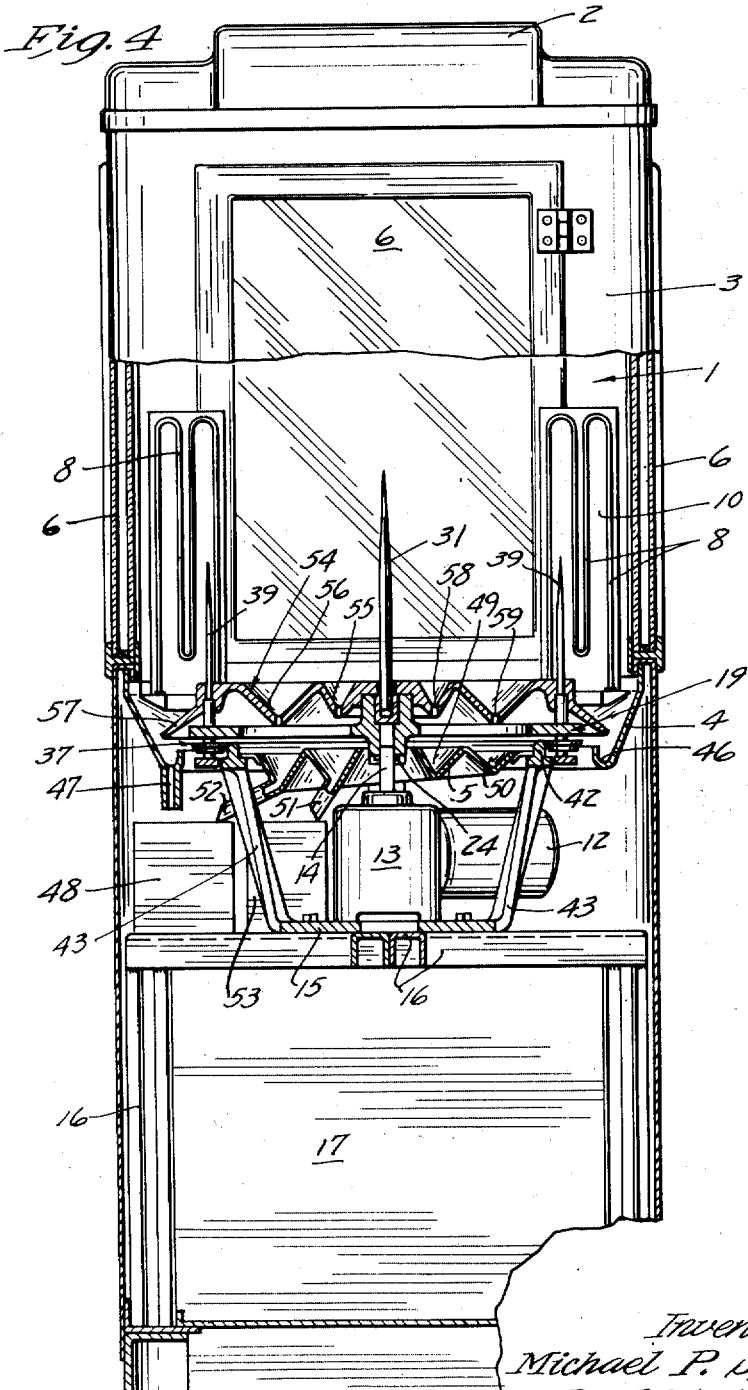

Aug. 28, 1951 M. P. SPARTALIS 2,565,786
COOKING MACHINE
Filed Sept. 29, 1950 3 Sheets-Sheet 3

Inventor
Michael P. Spartalis
By his Attorneys
Merchant & Merchant

Patented Aug. 28, 1951

2,565,786

UNITED STATES PATENT OFFICE 2,565,786

COOKING MACHINE

Michael P. Spartalis, St. Paul, Minn.

Application September 29, 1950, Serial No. 187,431

7 Claims. (Cl. 99—421)

My present invention relates to improvements in cooking machines of the general type disclosed and claimed in my prior Letters Patent of the United States No. 2,179,646 of November 14, 1939, and No. 2,482,601 of September 20, 1949, which type of machine involves a cooking chamber or oven containing rotary food conveying mechanism. In the embodiment of the invention herein illustrated as in the machine illustrated in my said prior patents, the rotary food conveying mechanism comprises a rotary food conveyor equipped with circumferentially spaced series of planetary food holders that are rotated on their own axes while rotating about the axis of the conveyor. The machine herein illustrated, like the machines of my said prior patents, also preferably embodies an inner rotary food holder located within the circle described by the circumferentially spaced series of food holders. While machines of the general character described here are primarily designed for barbecuing, baking, or roasting of meats, vegetables, and the like, it has been found that machines of the type described herein and in my prior patents may also very advantageously be used in the baking of bread, cake, pastries, and the like. An important object of my invention is the provision of a rotary food conveyor having radially spaced series of circumferentially spaced food holders whereby foods carried by one series of holders are maintained at a distance from the source of heat different from that between the source of heat and foods carried by another series of food holders.

Another highly important object of my invention is the provision of a novel arrangement whereby planetary movements are imparted to radially spaced series of food holders as set forth. To this end, I provide an annular track having concentric radially inner and outer track face portions and cooperating planetary food supporting elements mounted on a rotary conveyor in radially spaced inner and outer series or groups.

Another object of my invention is the provision of improved driving connections to the food conveyor mechanism.

Still another object of my invention is the provision of a machine of the above type which is relatively simple and inexpensive to produce, which is efficient in operation, and which is rugged in construction and durable in use.

The above and still further highly important objects and advantages of my invention will become apparent from the following detailed specification, appended claims, and attached drawings.

Referring to the drawings, which illustrate the invention, and wherein like characters indicate like parts throughout the several views:

Fig. 1 is a view in front elevation of my improved cooking machine;

Fig. 2 is an enlarged horizontal section taken substantially on the line 2—2 of Fig. 1, some parts being broken away;

Fig. 3 is a still further enlarged fragmentary detail in elevation as seen from the line 3—3 of Fig. 2;

Fig. 4 is a view partly in front elevation and partly in section taken substantially on the line 4—4 of Fig. 2, some parts being broken away;

Figure 5:
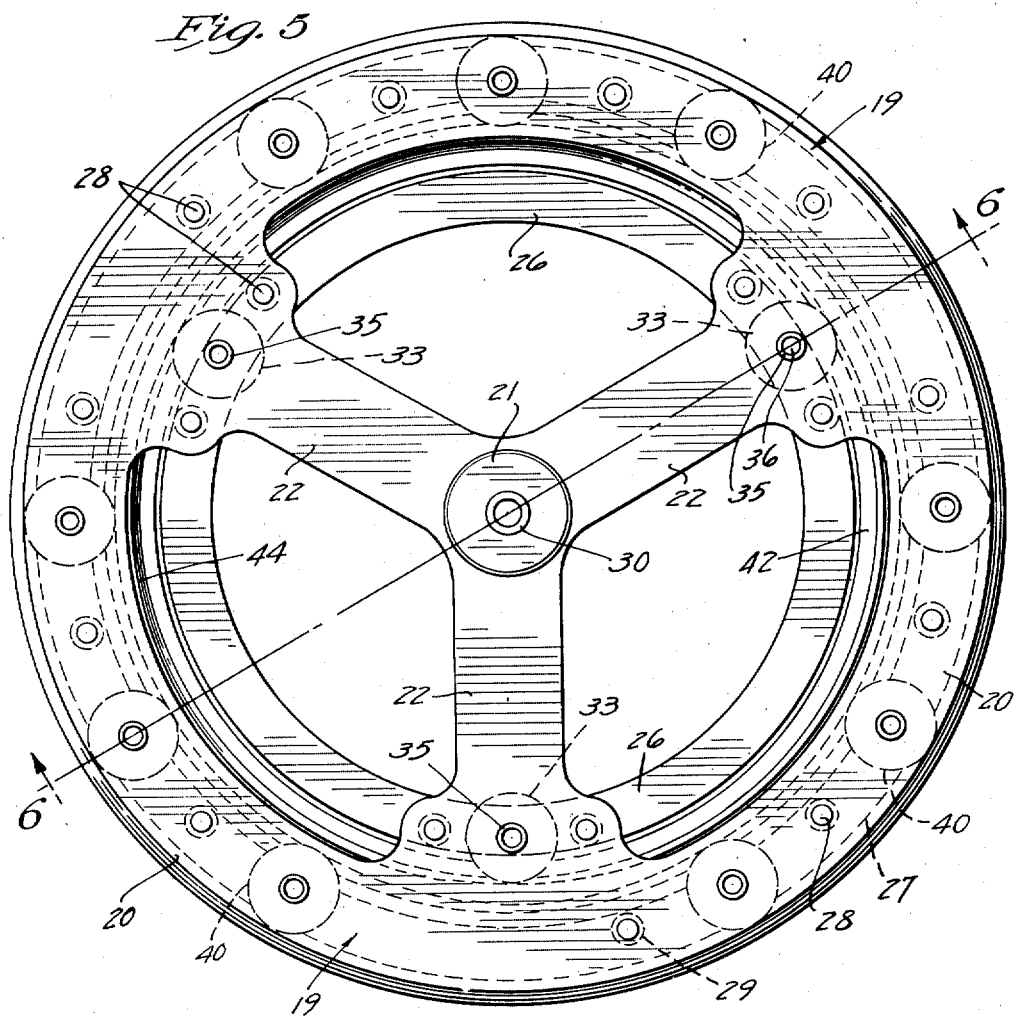
Fig. 5 is a view in plan of the conveyor mechanism of my invention on an enlarged scale.

In the embodiment of the invention illustrated, the oven or cooking chamber 1 is defined by a casing having top 2, side walls 3, and a generally downwardly and inwardly inclined bottom. The bottom of the cooking chamber is composed of a downwardly and inwardly declined basin-forming outer portion 4 and a removably inner basin-forming portion 5. These bottom portions 4 and 5 may hereinafter also be referred to as outer and inner collecting portions respectively. The sides 3 of the casing or cabinet are provided with glazed doors 6 permitting free access to the interior of the oven or cooking chamber, and also allowing continuous inspection or viewing of the contents during the cooking or heat treating operation. The top 2 and walls 3 are preferably insulated, the insulation being indicated at 7 in Fig. 2.

Heater means comprises a plurality of heating elements 8 mounted one each in one of the corners between the side walls 3 of the cooking chamber. These heating elements or units 8 are of the electrical resistance type conventionally used and are mounted in bases 9 rigidly secured to the corner portions of the outer bottom-forming element 4, and are provided with reflector plates or the like 10 which direct heat radiating from the elements 8 toward the central portion of the chamber 1. The heating elements 18 are supplied electricity from a suitable source not shown, the heat being controlled by a conventional rheostat, not shown, operated by a control knob 11. The food conveying and supporting mechanism, hereinafter to be described in detail, is driven by a suitable power unit in the nature of an electric motor 12 mounted in the casing below the bottom-forming elements 4 and 5 of the cooking chamber and on a speed reduction gear housing 13. A vertical drive shaft 14 is journalled in the gear housing 13 and is driven by the motor 12 through conventional speed reduction gearing, not shown but contained within the housing 13. The housing 13 is rigidly secured by suitable means to a base member 15 which is bolted or otherwise rigidly secured to the upper end of a frame 16 contained within the cabinet or casing below the bottom-forming elements 4 and 5. The cabinet defines a storage chamber or the like 17 below the base 15 and to which access may be had through a pair of doors or the like 18.

A circular conveyor 19 comprises an annular ring 20 and a central hub 21 connected by radial arms 22. The hub portion 21 at its lower end is provided with an axially extended bore 23 to axially slidably receive the upper end of the vertical drive shaft 14 and is adapted to be locked to said drive shaft 14 for common rotary movements therewith by the reception of a pin or the like 24 extending transversely through the shaft 14 and a downwardly opening notch or the like 25 in the hub 24. The conveyor further includes a pair of inner and outer concentric rings 26 and 27 secured to the outer ring portion and the radial arm 22 respectively by means of nut-equipped bolts or the like 28, and are maintained in spaced relation to said ring portion and radial arms 22 by spacers 29, see particularly Figs. 5 and 6. The upper end of the hub portion 21 is bored to receive an upwardly opening socket member 30 which is adapted to receive a food holder in the nature of a skewer 31. As shown, in Figs. 1, 2, and 4, the axis of the skewer 31 extends along the vertical center of the chamber 1 and that the heat elements or unit 8 are equidistant from the axis of the skewer 31.

Journalled for rotation in the conveyor 19 between the radial arms 22 and the underlying ring 26 is an inner series of three roller elements 32. Each of the roller elements 32 of said inner series comprises an inverted frusto-conical roller 33 having a traction face portion 34 and a shaft 35 extending upwardly through one of the radial arms 22 and terminating at its upper end in an upwardly opening socket 36. A radially outer series of roller elements 37 identical to the roller elements 32 are journalled in the ring portion 20 of the outer ring 27 of the conveyor 19 and are provided with upstanding socket-forming shaft portions 38 adapted to support food holders, such as skewers 39, or any of the type illustrated in my prior patents above identified. The roller elements 37 further comprise inverted frusto-conical rollers 40 having traction face portions 41 identical to the traction face portions 34 of the rollers 33 of the inner series.

Figure 6:
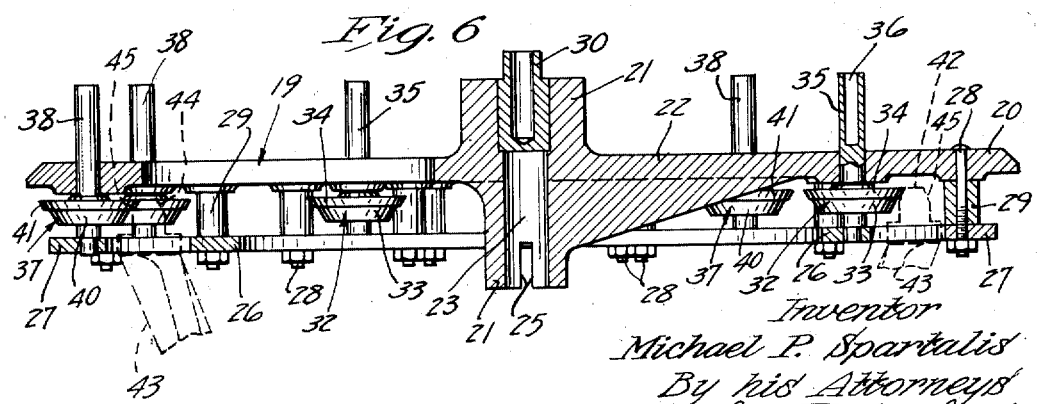
Fig. 6 is an axial section taken on the line 6—6 of Fig. 5.

The conveyor 19 is supported, and the roller elements 32 and 37 are adapted to have planetary movements imparted thereto, by engagement of their traction face portions with cooperating inner and outer traction faces on an annular track 42. The annular track 42 is integrally formed with a plurality of downwardly projecting legs 43 which at their lower ends form an integral part of the base 15. The inner and outer peripheral traction faces of the annular track 42, indicated at 44 and 45 respectively, slope in upwardly converging directions at angles equal to the angles of the traction face portions 34 and 41 of respective roller elements 32 and 37. As shown in Fig. 6, a slight clearance occurs between the upper portions of the several roller elements and the ring portion 20 and the radial arms 22 so that any inaccuracies in the manufacture of the several roller elements will not prevent the traction face of any roller element from making driving contact with its cooperating traction face portion of the annular track 42. Rotation of the conveyor 19 will cause rotary movements to be imparted to the several roller elements 32 and 37 about their own axes due to the engagement of the traction face portions 34 and 41 with respect to the traction faces 44 and 45 on the track 42, simultaneously with traveling movements of the several roller elements about the axis of the rotary conveyor 19. The greater radial distance of the axes of the roller elements 32 from the heat units 8 than that of the axes of the outer series of roller elements 37 permits the supporting of larger articles of food from the inner series of roller elements 32. Furthermore, if it is desired to cook or subject an article to the heat of the elements 8 for a greater period of time than desired for certain other articles of food, the operator will mount said articles on the radially inner series of holders.

The outer bottom-forming member 4 includes an annular trough 46 from one portion of which depends a drain or the like 47. An open-topped receiver 48 rests upon the frame 16 in a position to collect drippings from the drain 47. The inner basin-forming member 5 is carried by a portion of the annular track 42 and is formed to provide a pair of inner and outer concentric troughs 49 and 50 respectively, the bottoms of which slope toward one side and which are provided with respective drains 51 and 52, the latter of which overlies a portion of the open-top receiver 48. The drain 51 is adapted to deliver drippings into a second open-top receiver 53 also mounted on the supporting frame 16.

A generally circular drip pan 54 provides a false bottom for the cooking chamber and is carried by the upper end portion of the hub 21 and the several shaft portions 36 and 38 of their respective roller elements, see particularly Fig. 4. The drip pan 54 is formed with radially inner and outer circumferentially extending collecting troughs 55 and 56 respectively and a downwardly and outwardly sloping peripheral flange 57, the outer edge portion of which overlies the annular trough 46. The bottoms of the troughs 55 and 56 overlie the collecting troughs 49 and 50 respectively and are provided with circumferentially extended drain apertures 58 and 59 respectively through which juices flow from cooking meats and the like supported on the several skewers 31 and 39. Drippings from roasting meats or the like supported on the skewer 31 drop into the trough 55 and flow through the aperture 58 into the collecting trough 49 from whence they are caused to enter the receiver 53; whereas drippings from food articles mounted on skewers supported by the inner and outer roller elements 32 and 37 fall into the outer trough 56 and on the flange 57. Drippings or juices in the trough 56 pass through the apertures 59 therein to the collecting trough 50 and from thence to the receiver 48 through the drain 52. Likewise, juices or drippings falling on the flange 57 are collected in the trough 46 from whence they enter the receiver 48 through the drain 47. From the above, it will be seen that there is a distinct separation of juices from cooking meat on the central skewer 31 with respect to the juices from meats or the like supported on the skewers 39. Thus, if a large portion of meat such as a turkey or a ham is supported on the central skewer 31 and beef steaks or the like are mounted on the skewers 39, the juices from each will be maintained separate so that gravies may be made therefrom to conform with the type of meat being served.

With reference to Fig. 2, it will be seen that I have provided cover plates 60, one each for an opening in the false bottom or drip pan 54 through which one of the skewer-supporting shafts 35 and 38 extends. Each of the cover plates 60 is swingably mounted on the drip pan 54 as indicated at 61 toward and away from a position overlying its respective skewer-supporting shaft 36 or 38. This arrangement permits closing of apertures in the drip pan 54 when the machine is not utilized to employ all of the skewers 39, the unused skewers 39 of course being removed from their respective socket-forming shafts 35 or 38.

It will be seen by further reference to Fig. 2 that the troughs 55 and 56 in the drip pan 54 have sloping opposite end portions 62 and 63 inclusive. These sloping end portions overlie the radial arms 22 of the rotary conveyor 19 to prevent drippings from collecting thereon. Thus it should be clear that the circular conveyor mechanism and central driving connections will be maintained free of juices and other drippings from the food articles carried both by the central food holder or skewer 31 and by the planetary outer food holder or skewers 39, thereby greatly decreasing the necessary frequency of cleaning and the problem of servicing and maintaining the conveyor mechanism and drive connections; that the conveyor mechanism, its food holders, and the inner food holder are all very readily removable, that the annular conveyor mechanism is removable, replaceable, and may be washed or cleaned as a unit; and that the juices falling from foods carried by the planetary food holders and the juices from foods carried by the inner food holder will be maintained separate and separately collected. Of course, it will be understood that the receivers 48 and 53 are independently removable from the casing. The motor 12 may of course, be operated from any suitable source of electric energy and will preferably be under control of a switch not shown, but operated by a control knob or the like 64, see particularly Fig. 1.

My invention has been thoroughly tested and found to be completely satisfactory for the accomplishment of the objectives set forth; and, while I have shown and described a preferred embodiment of my novel cooking machine, it will be understood that the same is capable of modification without departure from the spirit and scope of the invention as defined in the claims.

What I claim is:

1. In a cooking machine, a casing providing a cooking chamber, a relatively fixed annular track adjacent the bottom of the cooking chamber, said track defining concentric radially spaced inner and outer traction face portions, a rotary conveyor, an inner series of circumferentially spaced planetary food-supporting roller elements journalled on the conveyor and having traction face portions in driving engagement with the inner traction face portion of the track, an outer series of circumferentially-spaced planetary food-supporting roller elements journalled on the conveyor and having traction face portions in driving engagement with the outer traction face portion of the track, driving means for the conveyor, and a heater located in the cooking chamber above the plane of the roller elements and in radially spaced relation to the paths of travel of food supported by the inner and outer planetary roller elements, whereby the circular paths of travel of the axes of the inner and outer planetary roller elements are radially spaced different distances from the heater.

2. In a cooking machine, a casing providing a cooking chamber, a relatively fixed annular track adjacent the bottom of the cooking chamber, said track defining concentric radially spaced inner and outer traction face portions, a rotary conveyor, an inner series of circumferentially spaced planetary roller elements journalled on the conveyor and having traction face portions in driving engagement with the inner traction face portion of the track, an outer series of circumferentially spaced planetary roller elements journalled on the conveyor and having traction face portions in driving engagement with the outer traction face portion of the track, generally vertically disposed food holders mounted on said roller elements for common planetary movements therewith, driving means for the conveyor, and a heater located in the cooking chamber above the plane of the roller elements and in radially spaced relationship to the paths of travel of food supported by said food holders on the inner and outer roller elements, whereby the circular paths of travel of the axes of the inner and outer planetary roller elements are radially spaced different distances from the heater.

3. The structure defined in claim 2 in which said heater is disposed in radially outwardly spaced relationship to the paths of travel of food supported by said food holders on the inner and outer roller elements.

4. In a cooking machine, a casing providing a generally rectangular cooking chamber, a relatively fixed annular track adjacent the bottom of the cooking chamber and centrally thereof, said track defining concentric radially spaced inner and outer traction face portions, a rotary conveyor, an inner series of circumferentially spaced planetary roller elements journalled on the conveyor and having traction face portions in driving engagement with the inner traction face portion of the track, an outer series of circumferentially spaced planetary roller elements journalled on the conveyor and having traction face portions in driving engagement with the outer traction face portion of the track, generally vertically disposed food holders mounted on said roller elements for common planetary movements therewith, driving means for the conveyor, and a plurality of heaters located one each in each of the corners of said cooking chamber above the plane of the roller elements and in radially outwardly spaced relationship to the paths of travel of food supported by said food holders on the inner and outer roller elements, whereby the circular paths of travel of the axes of the inner and outer planetary roller elements are radially spaced different distances from the heaters.

5. In a cooking machine, a casing providing a cooking chamber, a relatively fixed annular track adjacent the bottom of the cooking chamber, said track defining concentric radially spaced inner and outer peripheral track faces, a rotary conveyor, an inner series of circumferentially spaced planetary food supporting roller elements journalled on the conveyor and having peripheral traction faces in driving engagement with the inner peripheral traction face of the track, an outer series of circumferentially spaced planetary food-supporting roller elements journalled on the conveyor and having peripheral traction faces in driving engagement with the outer peripheral traction face of the track, driving means for the conveyor, and a heater located in the cooking chamber above the plane of the roller elements and in radially spaced relationship to the paths of travel of food supported by the inner and outer planetary roller elements, whereby the circular paths of travel of the axes of the inner and outer planetary roller elements are radially spaced different distances from the heater.

6. The structure defined in claim 5 in which said cooking chamber is generally rectangular in form, the axis of said annular track being extended centrally thereof, and in which said heater comprises a plurality of heating elements one each in one corner of said chamber.

7. In a cooking machine, a casing providing a cooking chamber, a relatively fixed annular track adjacent the bottom of the cooking chamber, said track defining concentric radially spaced inner and outer traction faces sloping in upwardly converging relationship, a rotary conveyor, an inner series of circumferentially spaced planetary food-supporting roller elements journalled on the conveyor and having conical traction faces in driving engagement with the inner sloping traction face of said track, an outer series of circumferentially spaced planetary food-supporting roller elements journalled on the conveyor and having conical traction faces in driving engagement with the outer sloping traction face of the track, driving means for the conveyor, and a heater located in the cooking chamber above the plane of the roller elements and in radially spaced relation to the paths of travel of food supported by the inner and outer planetary roller elements whereby the circular paths of travel of the axes of the inner and outer planetary roller elements are radially spaced different distances from the heater.

MICHAEL P. SPARTALIS.

No references cited.